(12) United States Patent
Gaiser (10) Patent No.: US 9,433,906 B2
(45) Date of Patent: Sep. 6, 2016

(54) MIXING ELEMENT (75) Inventor: Gerd Gaiser, Reutlingen (DE)

(73) Assignee: Eberspächer Exhaust Technology GMBH & CO. KG, Neunkirchen (DE)

(*) Notice: Subject to any disclaimer, the term of this patent is extended or adjusted under 35 U.S.C. 154(b) by 923 days.

(21) Appl. No.: 13/457,846

(22) Filed: Apr. 27, 2012

(65) Prior Publication Data

US 2012/0279207 A1    Nov. 8, 2012

(30) Foreign Application Priority Data

May 4, 2011   (DE) .................... 10 2011 075 252

(51) Int. Cl.
| | |
|---|---|
| F01N 13/08 | (2010.01) |
| B01F 5/06 | (2006.01) |
| F01N 3/20 | (2006.01) |
| B01F 3/04 | (2006.01) |
| F01N 3/28 | (2006.01) |

(52) U.S. Cl.
CPC ........... B01F 5/0616 (2013.01); F01N 3/2066 (2013.01); B01F 3/04021 (2013.01); B01F 2005/0639 (2013.01); F01N 3/2892 (2013.01); F01N 2240/20 (2013.01); F01N 2610/02 (2013.01); F01N 2610/08 (2013.01); Y02T 10/24 (2013.01)

(58) Field of Classification Search
CPC .................................................. B01F 5/0616
USPC ........................................................ 366/337
See application file for complete search history.

(56) References Cited

U.S. PATENT DOCUMENTS

| | | | | |
|---|---|---|---|---|
| 3,051,453 A | * | 8/1962 | Sluijters | ................ B01F 5/0641 138/42 |
| 3,923,288 A | * | 12/1975 | King | ..................... B01F 5/0617 138/42 |
| 4,034,965 A | | 7/1977 | King | |
| 4,208,136 A | * | 6/1980 | King | ..................... B01F 5/0613 138/37 |
| 4,753,535 A | | 6/1988 | King | |
| 5,484,203 A | | 1/1996 | King et al. | |
| 5,605,399 A | * | 2/1997 | King | .............................. 366/337 |
| 7,845,688 B2 | * | 12/2010 | Gallagher | ............... F16L 9/147 138/44 |
| 2005/0219947 A1 | * | 10/2005 | Carlson | ................ B01F 5/0616 366/337 |

(Continued)

FOREIGN PATENT DOCUMENTS

| | | |
|---|---|---|
| DE | 24 59 355 A1 | 7/1975 |
| DE | 195 01 241 A1 | 8/1995 |

(Continued)

*Primary Examiner* — Tony G Soohoo
*Assistant Examiner* — Elizabeth Insler
(74) *Attorney, Agent, or Firm* — McGlew and Tuttle, P.C.

(57) ABSTRACT

A mixing element (1) for a mixing device in an exhaust gas-conducting pipe (8) of an exhaust system of a combustion engine provides advantageous intermixing of the exhaust gas with an additive and an advantageous temperature distribution within the exhaust gas-additive mixture. The mixing element (1) includes at least four vanes (2) and a connecting section (3). The vanes (2) are angled off from the connecting section (3). Two vanes (2) which, with respect to a longitudinal axis (5) of the connecting section (3), are directly adjacent or two vanes (2) which are located directly opposite, with respect to the longitudinal axis (5) of the connecting section (3), are angled off towards different sides (4', 4") of the connecting section (3). The mixing element (1) as well as the connecting section (3) and the associated vanes (2) are embodied as shaped sheet metal part.

18 Claims, 4 Drawing Sheets

(56) References Cited

U.S. PATENT DOCUMENTS

2008/0066448 A1 3/2008 Halbei et al.
2009/0320453 A1* 12/2009 Salanta ............... B01F 3/04049
60/282

FOREIGN PATENT DOCUMENTS

| DE | 10 2006 043 225 A1 | 3/2008 |
| DE | 10 2008 040 293 A1 | 1/2010 |
| WO | 2009/157995 A1 | 12/2009 |

* cited by examiner

MIXING ELEMENT

CROSS REFERENCE TO RELATED APPLICATIONS

This application claims the benefit of priority under 35 U.S.C. §119 of German Patent Application DE 10 2011 075 252.8 filed May 4, 2011, the entire contents of which are incorporated herein by reference.

FIELD OF THE INVENTION

The present invention relates to a mixing element for a mixing device in an exhaust gas-conducting pipe of a combustion engine, in particular of a motor vehicle. The invention furthermore relates to a mixing device for an exhaust system of a combustion engine with at least one such mixing element.

BACKGROUND OF THE INVENTION

Mixing elements are frequently used components in exhaust systems for combustion engines. They are used, in particular with combustion engines of motor vehicles, in order to guarantee a homogeneous thermal and chemical distribution within an exhaust gas flow of the exhaust system. In particular, mixing elements play a fundamental role in the admixing of ammonia-containing additives, such as for example urea or "Adblue" to the exhaust gas. These additives are used in particular for the so-called selective catalytic reduction (SCR) of the exhaust gas, during which harmful nitric oxides are usually converted into nitrogen. Naturally, local concentrations and the local temperature play a decisive role for such reactions. It is therefore of great importance to guarantee a homogenous distribution of the additive and a homogeneous temperature distribution within the exhaust gas additive mixture, in order to have the mentioned reduction reactions in particular take place in a controlled and effective manner. This is usually ensured through mixing elements in the exhaust system.

SUMMARY OF THE INVENTION

The present invention deals with the problem of providing an improved or at least alternative embodiment for a mixing element of the type mentioned at the outset, which in particular fulfils the demanded mixing demands and is simple to produce.

The present invention is based on the general idea of providing at least four vanes with a mixing element of the mentioned type, which are coupled by a connecting section. Here, the connecting section has two sides, which are formed by the surfaces of the connecting section facing away from each other. The invention now utilises the realisation that adjacent vanes, which are located in different space halves separated by the connecting section, achieve an improved mixing of an exhaust gas and an additive and/or an improved temperature distribution within the exhaust gas-additive mixture. Thus, through this arrangement of the vanes, a distribution which in particular is even, i.e. homogeneous, of an additive within the exhaust gas, and/or an improved thermal distribution, i.e. a homogeneous temperature within the exhaust gas-additive mixture is achieved. The invention furthermore utilises the realisation that the production of such a mixing element as shaped sheet metal part is possible, by means of which a particularly favourable production is achieved.

In accordance with the inventive idea, a mixing element comprises four vanes, which are coupled together by a connecting section. Here, the connecting section has two sides, which are defined by the surfaces of the connecting section. The connecting section furthermore comprises a longitudinal axis, which because of the extension of the connecting section is defined corresponding to the direction with the greatest extension. The four vanes are now arranged in such a manner, that two vanes which are directly adjacent with respect to the longitudinal axis of the mixing element, are angled off towards different sides of the connecting section. Furthermore, two vanes which are located directly opposite each other with respect to the longitudinal axis of the mixing element, are angled off towards different sides of the connecting section. Furthermore, the mixing element is embodied as shaped sheet metal part, in particular through cutting and bending processes.

In an advantageous embodiment, the mixing element is produced from a single continuous sheet metal piece. Here, the production comprises in particular a cutting process and a forming process. The production of the mixing element from a single sheet metal part results in a particularly cost-effective production. The use of sheet metal as material of the mixing element furthermore ensures that the mixing element achieves a long lifespan even with corresponding thermal loading.

A further embodiment of the mixing element comprises six vanes. Here, it is likewise true for the vanes of this embodiment that two vanes which are directly adjacent with respect to the longitudinal axis of the mixing element are angled off towards different sides of the connecting section. Two vanes, which with respect to the longitudinal axis of the mixing element are located directly opposite, are likewise angled off towards different sides of the connecting section. As already mentioned, this embodiment can be configured as shaped sheet metal part. In particular, the embodiment can also be produced from a single continuous sheet metal piece, in particular through cutting processes and forming processes.

The number of the vanes of a mixing element is governed, according to the laws of fluid dynamics, that a straight number should be preferentially selected. However, mixing elements with an uneven number of vanes likewise belong to the scope of this invention.

According to a further advantageous embodiment, the mixing element at least partially contacts a pipe section associated with the mixing element. To this end, at least one of the vanes of the mixing element has an outer contour at a vane edge located on the outside associated with this vane, which is moulded complementarily to an inner contour of the pipe section associated with the respective vane, wherein the outer contour of the vane edge is moulded in such a manner that the associated vane, with the mixing element inserted in the pipe, contacts the pipe with the vane edge. In particular, this serves the purpose of being able to attach the mixing element in a suitable pipe section in a simple and retaining manner. The contact in this case can be both concentrated as well as linear. Through the lower heat transfer between mixing element and pipe section, a concentrated contact with the pipe section has a heat transfer that is different from that of a linear contact, during which the heat transfer between mixing element and pipe section is greater. Here, the exact embodiment of the contact can be adapted to the respective requirements.

According to a further embodiment, the connecting section comprises a sweep with respect to the longitudinal axis of the mixing element, which extends transversely to the longitudinal axis of the connecting element. For example, the longitudinal axis of the mixing element in the installed state extends parallel to the main flow direction of the exhaust gas. The longitudinal direction of the connecting section then extends transversely to the main flow direction of the exhaust gas. The sweep is then orientated in the main flow direction or opposite the main flow direction. Such a sweep leads to a corresponding change of the vane orientations. Because of this, a better mixing-through of the exhaust gas-additive mixture is achieved in particular through the generating of an additional swirl.

It is pointed out that the vanes and the connecting section can have any shape and size. Here, reference is made in particular to vanes having an elliptical shape of their outer edge. If the vanes each have a pointed shape of the associated vane edges, this results in an improved mixing-through of the additive with the exhaust gas in particular in the case of liquid additives, since the drops of the additive are reduced in size on the pointed vane edges.

With an advantageous further development, at least one mixing element according to the invention is integrated in a mixing device for an exhaust system of a combustion engine, in particular of a motor vehicle. Here, the mixing element is arranged in an exhaust gas-conducting pipe of the mixing device or of the exhaust system. Thus, the mixing device ensures an improved mixing-through of the exhaust gas-additive mixture and/or an improved, i.e. homogeneous temperature distribution within the exhaust gas-additive mixture.

With a further embodiment, the mixing device comprises an envelope, which envelopes at least one mixing element. Here, the envelope is such that at least one of the vanes of the mixing element has an outer contour on an associated vane edge located on the outside, which contacts this envelope. Here, both concentrated as well as linear contacts serve the objective. Thus, a hold of the mixing element in the envelope is ensured in particular. It is to be understood that with this embodiment a contact between the mentioned vane edge and a pipe section associated with the mixing element is not possible.

In a further embodiment, the envelope can be inserted in a pipe section associated with the envelope. Furthermore, the envelope can contact this pipe section, wherein the contact can be concentrated or linear. With this arrangement, the exhaust gas preferably flows through the envelope. Here, in particular in the case of a concentrated contact between envelope and the pipe section associated with the envelope, a thermal insulation in particular between envelope or mixing element and pipe section is ensured.

The envelope is optionally equipped with a flange radially arranged on the envelope. Because of this, different exhaust gas-conducting pipe sections, in particular, can be coupled. As flange, reference is made in particular to a beaded gasket, which additionally results in a sealing of the construction.

If an envelope with at least one mixing element is located in a pipe section, this pipe section with a further embodiment can have a changed size and/or a changed shape compared to a pipe section without envelope or mixing element. This embodiment, in particular, serves the purpose of making available, through a suitable change of the size or shape of the pipe section with envelope or mixing element, a same cross section conducting exhaust gas in this pipe section.

If a mixing device has a plurality of mixing elements, these mixing elements can be arranged one after the other. Here, an arrangement of the mixing elements is preferred for example, wherein the mixing elements in particular overlap one another axially or are arranged partially within one another.

It is pointed out that the mixing elements are preferentially arranged in such a manner that their longitudinal axis is arranged parallel to a main flow direction of the exhaust gas-conducting pipe. Embodiments, wherein the longitudinal axes of the individual mixing elements are substantially arranged parallel to the main flow direction are also advantageous.

Here respectively two vanes of such a mixing element can be arranged offset transversely to one another along the main flow direction. In addition, embodiments are advantageous in which opposite vanes of the mixing element along the main flow direction are angled in the main flow direction on different sides of the connecting section. This means that the surfaces of the vanes, in particular on the upflow side, are flowed against substantially frontally by the exhaust gas, in order to achieve an intensified mixing-through or respectively swirling of the exhaust gas.

If the individual mixing elements have a sweep of their connecting section, this sweep is preferentially designed in such manner that it is positive or negative with respect to the main flow direction.

It is to be understood, that the features mentioned above and still to be explained in the following cannot only be used in the respective combination stated but also in other combinations of by themselves without leaving the scope of the present invention.

Preferred exemplary embodiments of the invention are shown in the drawings and are explained in more detail in the following description, wherein same reference numbers refer to same or similar of functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, according to FIGS. 1 to 7, a mixing element 1 comprises at least four vanes 2, which are coupled to one another through a connecting section 3. As is shown in FIG. 1 and FIG. 5 to FIG. 7, the connecting section 3 furthermore has two sides 4', 4", which are facing away from each other. According to the spatial position of the mixing element 1 reflected in FIG. 1 and FIG. 5 to FIG. 7, the two sides 4', 4" can also be described as top 4' and bottom 4".

Figure 1:
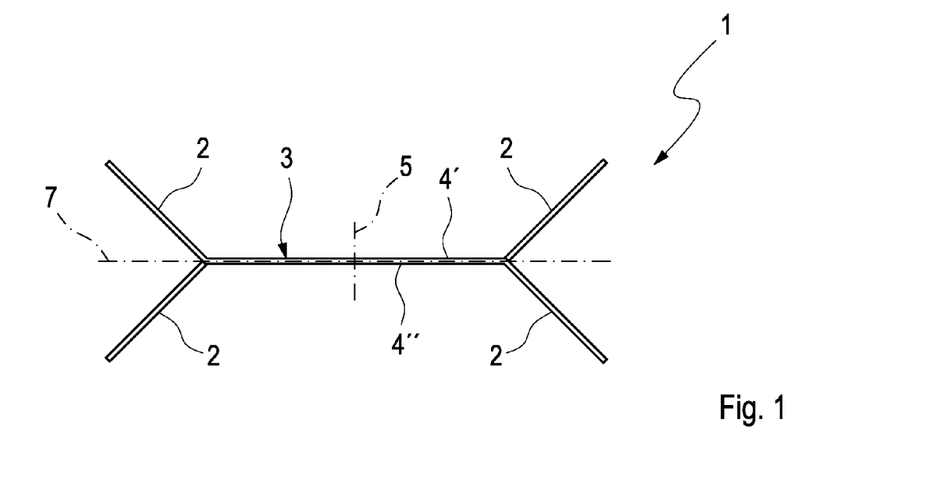
FIG. 1 is a lateral view of a mixing element according to the invention.

The mixing element 1 shown in FIG. 1 comprises four vanes 2, which are connected to one another through the connecting section 3. Here, both the vanes 2 as well as the connecting section 3 have a plane flat shape. However, curved shapes of the vanes are also conceivable. Furthermore, all vanes 2 have the same size. The vanes 2 are now angled off from the connecting section 3 in such a manner that with respect to a longitudinal axis 5 (see FIGS. 2 to 4) of directly adjacent vanes it is true that one of the vanes 2 is angled off towards a side 4' of the connecting section 3 and the other vane 2 is angled off towards the other side 4" of the connecting section 3. The same applies to vanes 2 directly located opposite with respect to the longitudinal axis 5, i.e. that one of these vanes 2 is angled off towards a side 4' of the connecting section 3 and the other vane 2 is angled off towards the other side 4" of the connecting section 3. Here, all vanes 2 have the same angle to the respective sides 4', 4" of the connecting section 3 to which they are angled off.

Figure 2:
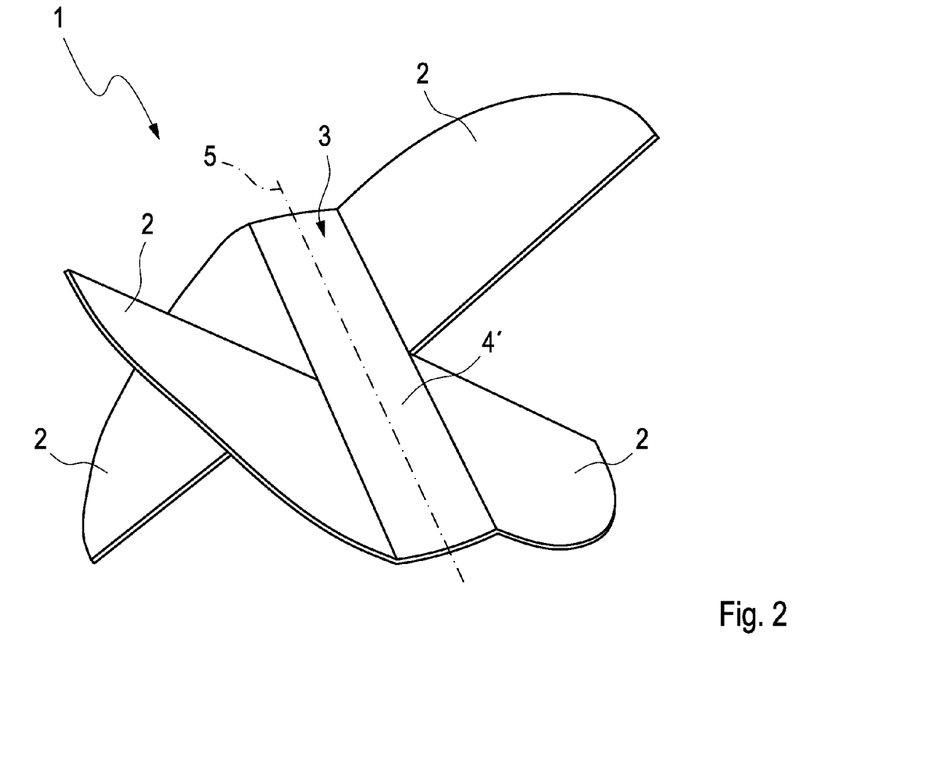
FIG. 2 is a perspective view showing an embodiment of the mixing element.

The embodiment of the mixing element 1 shown in FIG. 2 shows four vanes 2, which are connected to one another through the connecting section 3. Here, the connecting section 3 has an elongated flat shape, wherein its longitudinal axis 5 runs along the long side. This mixing element 1 is produced from a single continuous work piece, preferentially of sheet metal, in particular through cutting and forming. Here, the sheet metal piece has a flat and round shape prior to the forming. Because of this, all vanes 2 have a straight inner edge which are directed towards the inside of the mixing element 1 and at a vane tip meet a round outer edge of the vane 2. The respective vanes 2 which are directly adjacent with respect to the longitudinal axis 5 of the connecting section 3 are angled off in such a manner that one of these vanes 2 is angled off towards a side 4' of the connecting section 3 and the other vane 2 is angled off towards the other side 4". The vanes 2, which are directly adjacent with respect to the longitudinal axis 5, are also angled off in such a manner that one of the vanes 2 is angled off towards a side 4' of the connecting section 3 and the other vane 2 towards the other side 4" of the connecting section 3.

Figure 3:
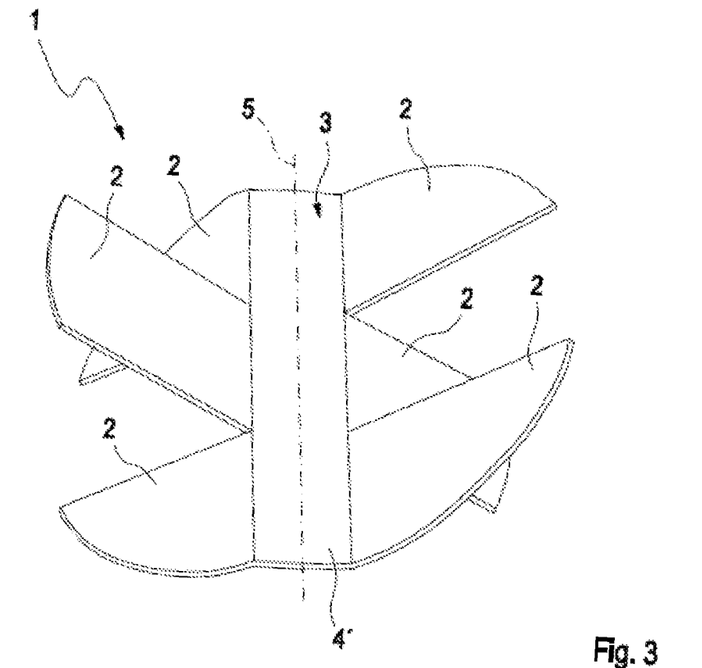
FIG. 3 is a perspective view showing another embodiment of the mixing element.

An embodiment of the mixing element 1 having six vanes 2 is shown in FIG. 3. This mixing element 1, too, can be formed of a single continuous flat and round sheet metal piece. Since the vanes 2 are arranged along the longitudinal sides of the connecting section 3, the outer vanes 2 have straight inner edges, which in a pointed transition meet rounded outer edges of the respective vane 2. The, on the respective long sides of the connecting piece 3, middle vanes 2 each have two straight inner edges, which end on vane tips in round outer contours of these vanes 2. The vanes 2 which with respect to the longitudinal axis 5 of the connecting section 3 are directly adjacent are angled off in such a manner that one of these vanes 2 is angled off towards a side 4' of the connecting section 3 and the other vane 2 is angled off towards the other side 4". The vanes 2, which with respect to the longitudinal axis 5 are directly adjacent, are angled off in such a manner that one of the vanes 2 is angled off towards a side 4' of the connecting section 3 and the other vane 2 towards the other side 4" of the connecting section 3.

Figure 4:
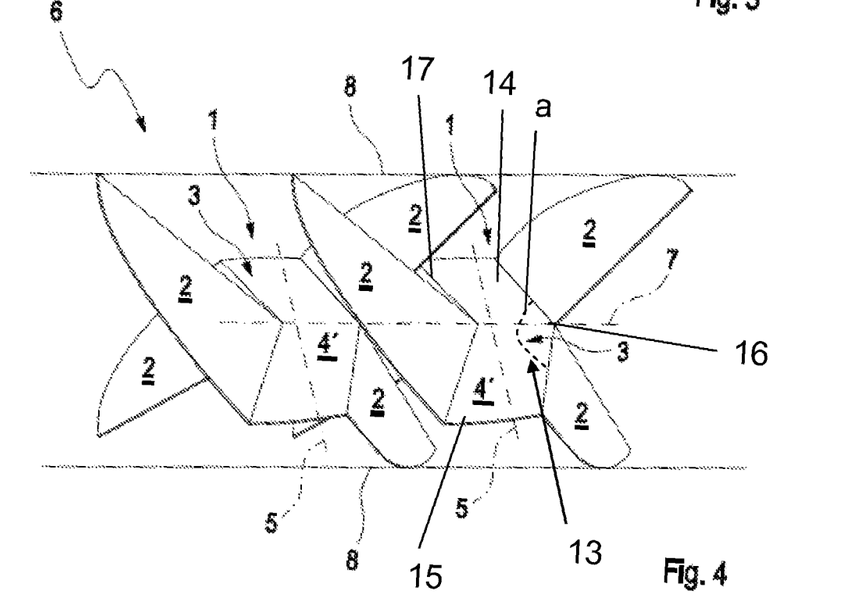
FIG. 4 is a perspective view of a mixing device.

FIG. 4 shows two identical mixing elements 1 of a mixing device 6. The mixing elements 1 in this case have a sweep 13 with respect to the longitudinal axis 7 of the respective mixing element 1 and are arranged in such a manner that they partially overlap one another radially. The sweep 13 is defined by a first connecting section portion 14 and a second connecting section portion 15 of the connecting section 3.

An angle a is defined by the first connecting section portion 14 and the second connecting section portion 15. The connecting section 3 has a swept forward edge 17 or a back edge 16 with respect to the longitudinal axis 7 of the mixing element 1. The longitudinal axis 7 forms a bend axis about which the first connecting section portion 14 and the second connecting section portion 15 are bent. The mixing elements 1 furthermore comprise four vanes 2 each. For the vanes 2 of the respective mixing elements 1 it is true, in this case, that vanes 2 which with respect to the respective longitudinal axis 5 are directly adjacent, are each angled off towards a side 4', 4" of the connecting piece 3. The same applies to two vanes 2 located directly opposite with respect to the longitudinal axis 5. The vanes 2 of both mixing elements 1 show straight inner edges, which in a tip meet rounded outer edges of the associated vane 2. The mixing elements 1 are arranged in a pipe 8 (the pipe 8 is indicated as a line for reasons of representation), wherein the outer edges of the vanes 2 partially contact the pipe 8.

Figure 5:
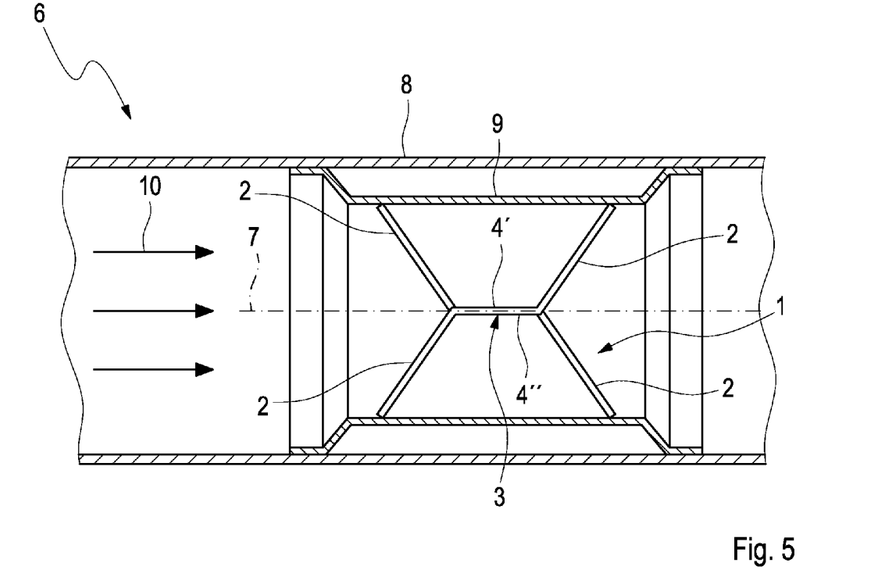
FIG. 5 is a longitudinal sectional view through the mixing device showing one of different embodiments.

The mixing element 1 of a mixing device 6 shown in FIG. 5 comprises four vanes 2, which with respect to a longitudinal axis 5 of the connecting section 3 are angled off towards different sides 4', 4" of the connecting section 3. Here, it is also true that two vanes 2 which with respect to the longitudinal axis 5 are located directly opposite or two vanes 2 which with respect to the longitudinal axis 5 are directly adjacent, are angled off towards different sides 4' and 4" of the connecting section 3. In the case of the mixing device 6 shown here, the vanes 2 of the mixing element 1 through their outside edges contact an envelope 9 enveloping them. In the process, the mixing element 1 partially fills the envelope 9 axially and in the middle. Furthermore, the envelope 9 is embodied in such a manner that it contacts a pipe 8 associated with this envelope 9 in a linear manner. Here, the envelope 9 contacts the pipe 8 only in a region, in which the mixing element 1 is not located, as a result of which in the region, in which the mixing element 1 is located, a gap between the envelope 9 and the pipe 8 is created. The envelope 9, furthermore, is axially shorter than the pipe 8, so that the envelope 9 only partially fills the pipe 8. The envelope 9 and the mixing element 1 are now arranged in such a manner that the longitudinal axis 7 of the mixing element 1 is arranged parallel to a main flow direction 10 of the exhaust gas of the exhaust gas-conducting pipe 8 symbolised by arrows. Here respectively two vanes 2 of the respective mixing element 1 are arranged offset transversely to one another along the main flow direction 10, whilst opposite vanes 2 along the main flow direction 10 are angled in the main flow direction 10 on different sides 4', 4" of the connecting section 3. Therefore, the respective vane stands "in the way" of the onflowing exhaust gas with a substantial surface, so that an intensive swirling or respectively through-mixing of the exhaust gas is brought about.

Figure 6:
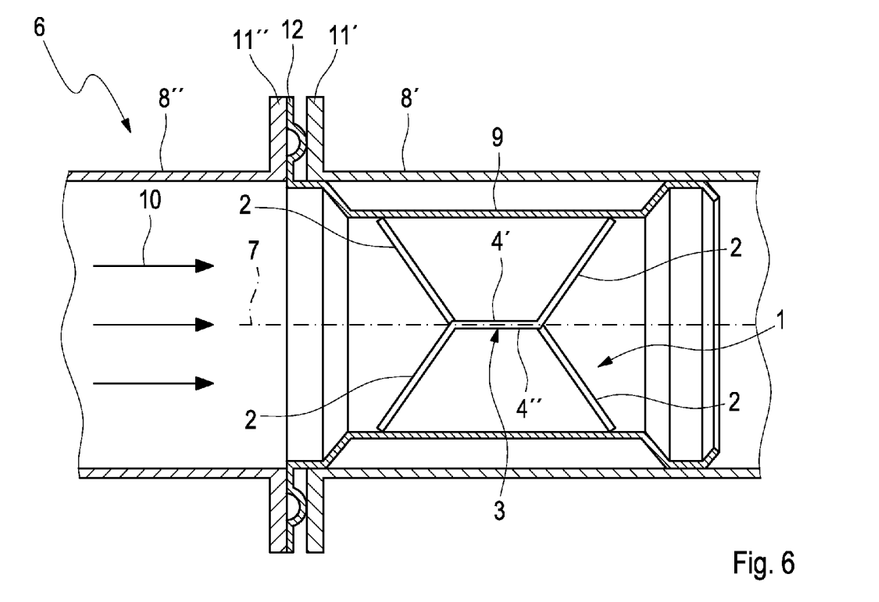
FIG. 6 is a longitudinal sectional view through the mixing device showing another of different embodiments.
Figure 7:
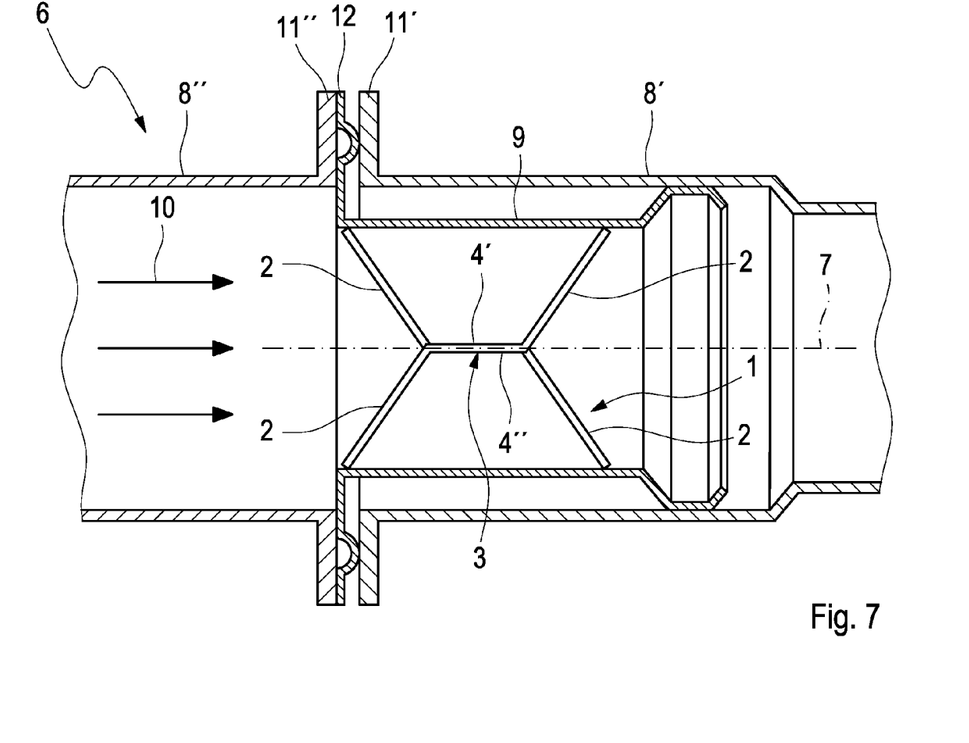
FIG. 7 is a longitudinal sectional view through the mixing device showing another of different embodiments.

FIG. 6 and FIG. 7 each show a mixing device 6, each of which comprises two pipe sections 8' and 8". Furthermore, both mixing devices 6 each comprise a mixing element 1, wherein two vanes which are directly adjacent or located directly opposite with respect to the longitudinal axis 5 of the associated mixing element 1 are each angled off towards different sides 4' and 4" of the associated connecting section 3. The respective mixing elements 1 are attached in the respective mixing devices 6 in such a manner that their longitudinal axis 7 runs parallel to the main flow direction 10. Furthermore, the respective mixing elements 1 of the mixing devices 6 are arranged in an envelope 9 and in the process partially fill this envelope 9 axially. The envelope 9 of the mixing devices 6 is designed in such a manner that on one of its sides which corresponds to the left side of the spatial position shown in FIGS. 6 and 7, it linearly contacts one of the pipe sections 8' in a region in which the mixing element 1 is not located and with its ends facing away from the mixing element 1 is angled off from this pipe section 8'. On the other side, i.e. on the right side of the envelope 9, the envelope 9 linearly contacts the pipe section 8' in a region in which the mixing element 1 is not located. Thus, in the region in which the mixing element 1 is located, a gap is created between the envelope 9 and the pipe section 8'. Here, the envelope 9 protrudes over the pipe section 8' axially towards the other pipe section 8''. The pipe sections 8' and 8'' each have two flanges 11' and 11'', which are arranged radially to the associated pipe section 8', 8''. Here, the flanges 11' of the pipe section 8' are facing the other pipe section 8'' and the flanges 11'' of the pipe section 8'' are facing the pipe section 8'' in such a manner that in each case one of the flanges 11' of the pipe section 8' is located opposite one of the flanges 11'' of the pipe section 8''. The sleeve 9 furthermore comprises two flanges 12, each of which are arranged radially to the envelope 9 and are located between the flanges 11' and 11'' of the pipe sections 8' and 8''. The flanges 12 of the envelope 9 in this case show the form of a beaded gasket. In particular, these embodiments serve for a simplified assembly of a mixing device 6.

The pipe section 8' shown in FIG. 7, with which the envelope 9 is directly contacted, additionally comprises a variation of the shape and size. Here, the radius of the pipe section 8' in the region in which the envelope 9 or the mixing element is located, is larger than the radius of the other pipe section 8''. On the side of the pipe section 8' facing away from the other pipe section 8'', i.e. along the main flow direction 10, the pipe section 8' tapers in a region in which the envelope 9 or the mixing element 1 is not located. Here, the pipe section 8' tapers so far until its radius corresponds to the radius of the other pipe section 8''. In particular, this serves for the purpose of making available an adapted cross section of the pipe section 8' for the exhaust gas in a region in which the mixing element 1 and/or envelope 9 is/are located, as in a region in which no mixing element 1 and/or envelope 9 is/are present.

While specific embodiments of the invention have been shown and described in detail to illustrate the application of the principles of the invention, it will be understood that the invention may be embodied otherwise without departing from such principles.

What is claimed is:

1. A mixing element for a mixing device in an exhaust gas-conducting pipe or pipe section of an exhaust system of a combustion engine, the mixing element comprising:
    four vanes; and
    a connecting section having a longitudinal axis and having two sides, said vanes being angled off said connecting section, wherein:
        the mixing element is produced from a single continuous sheet metal piece through forming;
        two of said four vanes are directly adjacent with respect to the longitudinal axis of said connecting section and are angled off to wards different sides of said connecting section;
        two of said four vanes are located directly opposite with respect to the longitudinal axis of said connecting section and are angled offtowards different sides of said connecting section;
        said connecting section comprises a first connecting section portion and a second connecting section portion, said first connecting section portion being bent relative to said second connecting section portion forming a bend axis by a bend in the single continuous sheet metal piece, said first connecting section portion being integrally connected to said second connecting section portion to define a bent one-piece connecting section; and
        said mixing element with each of said connecting section and said four vanes is embodied as shaped sheet metal part.

2. The mixing element according to claim 1, wherein:
    at least one of said four vanes has an associated vane edge, located on an outside, comprising an outer contour which is shaped complementarily to an inner contour of the exhaust gas-conducting pipe or pipe section associated with the respective vane;
    said at least one of said four vanes contacts the exhaust gas-conducting pipe or pipe section with said vane edge with the mixing element inserted in the exhaust gas-conducting pipe or pipe section.

3. The mixing element according to claim 1, wherein said first connecting section portion and said second connecting section portion define an angle with respect to a longitudinal axis of the mixing element, said longitudinal axis of said mixing element being arranged parallel to a flow of fluid, said angle being positive or negative with respect to the flow of fluid.

4. A mixing device for a motor vehicle exhaust system of a combustion engine, the mixing device comprising:
    an exhaust gas-conducting pipe or pipe section; and
    a mixing element connected to said exhaust gas-conducting pipe or pipe section, said mixing element comprising four vanes and a connecting section having a longitudinal axis and having two sides, said vanes being angled off said connecting section, wherein:
        the mixing element is produced from a single continuous sheet metal piece;
        two of said four vanes are directly adjacent with respect to the longitudinal axis of said connecting section and are angled off towards different sides of said connecting section;
        two of said four vanes are located directly opposite with respect to the longitudinal axis of said connecting section and are angled off towards different sides of said connecting section;
        said connecting section has a sweep with respect to the longitudinal axis of the mixing element;
        said connecting section comprises a first connecting section portion and a second connecting section portion;
        said sweep is defined by said first connecting section portion and said second connecting section portion;
        said first connecting section portion is integrally connected to said second connecting section portion to define a bent one-piece connecting section;
        said first connecting section portion is bent relative to said second connecting section portion forming a bend axis by a bend in the single continuous sheet metal piece, said bending axis extending transverse to said longitudinal axis; and
        the sweep of the connecting section is positive or negative with respect to the main flow direction.

5. The mixing device according to claim 4, further comprising:
an envelope enveloping the mixing element in such a manner that at least one of said four vanes has an outer contour on an associated vane edge, located outwardly, which contacts said envelope.

6. The mixing device according to claim 5, wherein said envelope is inserted in said exhaust gas-conducting pipe or pipe section associated with the envelope.

7. The mixing device according to claim 5, wherein said envelope comprises a radially arranged flange forming a beaded gasket whereby one of different exhaust gas-conducting pipe sections can be coupled.

8. The mixing device according to claim 4, wherein said mixing element is located in said exhaust gas-conducting pipe or pipe section, and said exhaust gas-conducting pipe or pipe section has at least partially a changed shape and/or changed size relative to another exhaust gas-conducting pipe or pipe section.

9. The mixing device according to claim 5, wherein said mixing element and the envelope are located in said exhaust gas-conducting pipe or pipe section, and said exhaust gas-conducting pipe or pipe section has at least partially a changed shape and/or changed size relative to another exhaust gas-conducting pipe or pipe section.

10. The mixing device according to claim 4, further comprising:
another mixing element connected to said exhaust gas-conducting pipe or pipe section, said another mixing element comprising four vanes and a connecting section having a longitudinal axis and having two sides, said vanes being angled off said connecting section, wherein two of said four vanes are directly adjacent with respect to the longitudinal axis of said connecting section and are angled off towards different sides of said connecting section, two of said four vanes are located directly opposite with respect to the longitudinal axis of said connecting section and are angled off towards different sides of said connecting section and
said another mixing element with each of said connecting section and said four vanes is embodied as shaped sheet metal part, said mixing element and said another mixing element providing a plurality of mixing elements, which are arranged within one another and/or axially overlapping.

11. The mixing device according to claim 4, wherein at least two of said four vanes are arranged offset transversely to one another along the main flow direction.

12. The mixing device according to claim 4, wherein at least two of said four vanes, lying opposite along the main flow direction, are angled in the main flow direction on different sides of the connecting section.

13. A motor vehicle combustion engine exhaust system comprising:
an exhaust gas-conducting pipe or pipe section receiving a flow of fluid; and
a mixing element connected to said exhaust gas-conducting pipe or pipe section, said mixing element comprising four vanes and a connecting section having two sides, said vanes being angled off said connecting section, wherein:
the mixing element is produced from a single continuous sheet metal piece;
said connecting section comprises a first connecting section portion and a second connecting section portion;
said first connecting section portion is bent relative to said second connecting section portion forming a bend axis by a bend in the single continuous sheet metal piece, said bending axis intersecting said longitudinal axis.

14. The exhaust system according to claim 13, wherein:
at least one of said four vanes has an associated vane edge, located on an outside, comprising an outer contour which is shaped complementarily to an inner contour of the exhaust gas-conducting pipe or pipe section associated with the respective vane;
said at least one of said four vanes contacts the exhaust gas-conducting pipe or pipe section with said vane edge with the mixing element inserted in the exhaust gas-conducting pipe or pipe section.

15. The exhaust system according to claim 13, wherein said connecting section has a swept forward or back edge.

16. The exhaust system according to claim 13, wherein said further comprising:
an envelope enveloping the mixing element in such a manner that at least one of said four vanes has an outer contour on an associated vane edge, located outwardly, which contacts said envelope, said envelope connecting said mixing element to said exhaust gas-conducting pipe or pipe section.

17. The mixing element according to claim 1, wherein at least two of said four vanes are arranged offset transversely to one another along the direction of a fluid flow, each of said at least two of said four vanes comprising a planar vane surface, wherein at least a portion of said planar vane surface of one of said at least two of said four vanes overlaps at least a portion of said planar vane surface of another one of said at least two of said four vanes, wherein said at least said portion of said planar vane surface of said one of said at least two of said four vanes is located directly opposite said at least said portion of said planar vane surface of said another one of said at least two of said four vanes.

18. The mixing device according to claim 4, wherein each of said at least two of said four vanes comprises a planar vane surface, wherein at least a portion of said planar vane surface of one of said at least two of said four vanes overlaps at least a portion of said planar vane surface of another one of said at least two said four vanes in a radical direction.

* * * * *